United States Patent Office 2,963,619
Patented Dec. 6, 1960

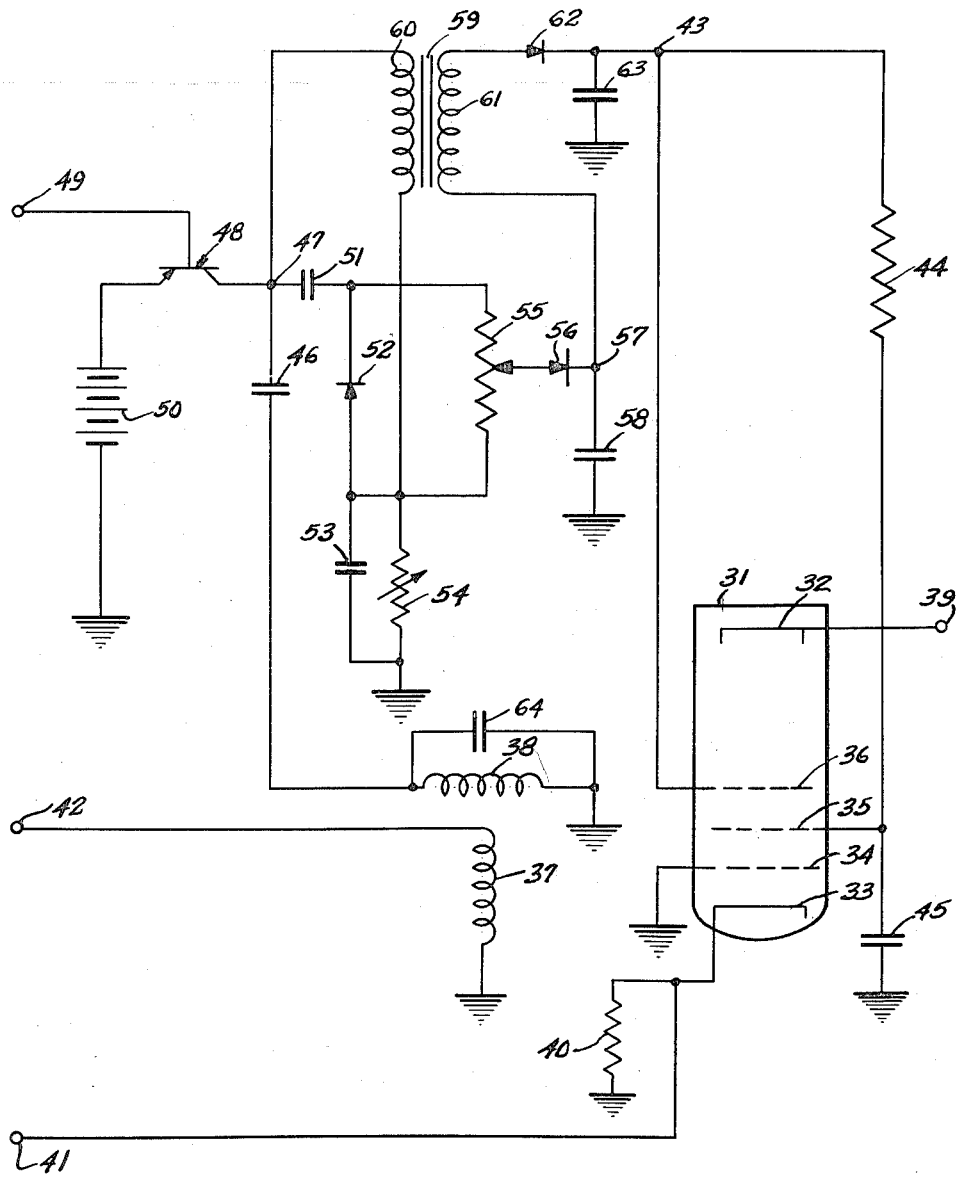

2,963,619

POWER SUPPLY CIRCUIT

George H. Fathauer, Decatur, Ill., assignor to Thompson Ramo Wooldridge Inc., a corporation of Ohio Filed Apr. 1, 1958, Ser. No. 725,536

12 Claims. (Cl. 315—27)

This invention relates to a power supply circuit which is particularly designed for supplying operating voltages for a television camera tube circuit, although the principles of the invention have general application.

An object of this invention is to provide a power supply circuit for developing a regulated high voltage from a relatively low voltage direct current source.

Another object of this invention is to provide a television camera tube high voltage circuit utilizing energy intermittently released from a deflection coil.

A further object of this invention is to provide a power supply circuit having a regulated output which is readily adjustable.

Still another object of this invention is to provide a power supply circuit which is economically constructed from a minimum number of components and yet is rugged and reliable in operation.

According to this invention, an inductance element is intermittently connected to a direct current source and a rectifier element is arranged to connect a capacitor element across the inductance element to charge the capacitor element during the intervals when the inductance element is disconnected from the source. It will be appreciated that it is possible with this arrangement to induce voltages which are relatively high as compared to the voltage of the direct current source. However, such voltages are apt to vary greatly with variations in load and other operating conditions. In accordance with this invention, means are provided for limiting the voltage across the rectifier element when the inductance element is disconnected from the source. Such means is preferably provided within the rectifier element itself, by using an element in the form of a Zener diode. Such diodes are known in the art and have a characteristic such that the voltage thereacross is limited to a certain value, with respect to current flow in the reverse direction. In other words, when current flow in one direction, the Zener diode has a comparatively low impedance and with current flow in the reverse direction, the impedance automatically varies in a manner to maintain the voltage thereacross constant within limits.

An output circuit is coupled across one of the elements, and preferably includes rectifier means arranged to conduct during the time interval when the conductor element is connected to the source. The output circuit preferably includes filter means in addition. With this arrangement, a D.C. output is obtained, which is regulated to a substantially constant voltage.

In one arrangement, for example, the output circuit is coupled across the rectifier element. To provide adjustment, as is oftentimes desirable, a potentiometer may be connected across the rectifier element and the movable contact of the potentiometer is connected to a rectifier and filter circuit.

To develop higher voltages, a step-up transformer may be utilized with the primary thereof connected across one of the elements, such as the inductance element. The secondary may then be connected to a rectifier and filter arrangement.

It will be appreciated that these power supply circuits develop a regulated high voltage, using a minimum number of components. The circuits are rugged and reliable in operation, and can be readily adjusted if desired.

The circuit is particularly advantageous when used to develop the high voltage required for operation of a television camera tube. In this case, the circuit is powered by the energy released from the horizontal deflection coils during retrace.

This invention contemplates other objects, features and advantages which will become more fully apparent from the following detailed description taken in conjunction with the accompanying drawings which illustrate preferred embodiments and in which:

Figure 3 is a circuit diagram of a television camera tube power supply circuit constructed according to the principles of this invention.

Figure 1:
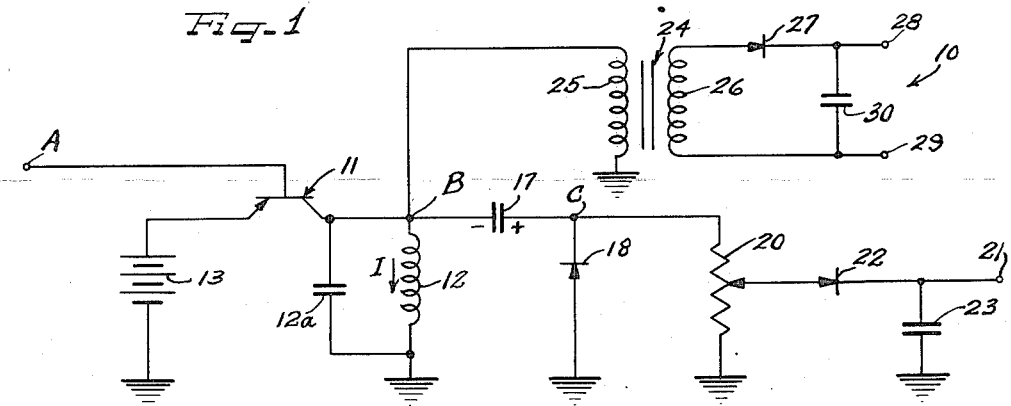
Figure 1 is a circuit diagram of one preferred form of power supply constructed according to the principles of this invention.

Referring to Figure 1, reference numeral 10 generally designates a power supply circuit constructed according to the principles of this invention.

In the circuit 10, a switching device in the form of a transistor 11 is used to intermittently connect an inductance element 12 to a battery or other direct current source 13. The emitter of the transistor 11 is connected to the positive terminal of the battery 13, the collector is connected to the inductance element 12 and the base is connected to an input terminal A. A voltage is applied to the terminal A having a wave form as indicated by reference numeral 14 in Figure 2. When the potential of the base is reduced to a value less than that of the emitter, the emitter is effectively connected to the collector, while being disconnected when the base potential is increased above that of the emitter. The inductance element 12 is thus periodically connected to the battery for an "on" period while being periodically disconnected for an "off" period.

During the on period, the current through the inductance element increases to store up energy which is released during the off period and is used to produce the output voltage in a manner as will be described. A capacitor 12a is preferably connected across the inductance element to permit more effective use of the stored energy. Preferably, the capacitor 12a and inductance element 12 form a resonant circuit having a period equal to twice the duration of the off period. With this arrangement, a half cycle "ring" or negative voltage pulse is produced across the inductance element, the amplitude of the pulse voltage being substantially equal to $$\frac{e_{bb} \times \pi \times T_{on}}{2T_{off}}$$

where $e_{bb}$ is the battery voltage and $T_{on}$ and $T_{off}$ are the duration of the on and off periods, respectively. This equation assumes that the inductance element has negligible resistance.

Figure 2:
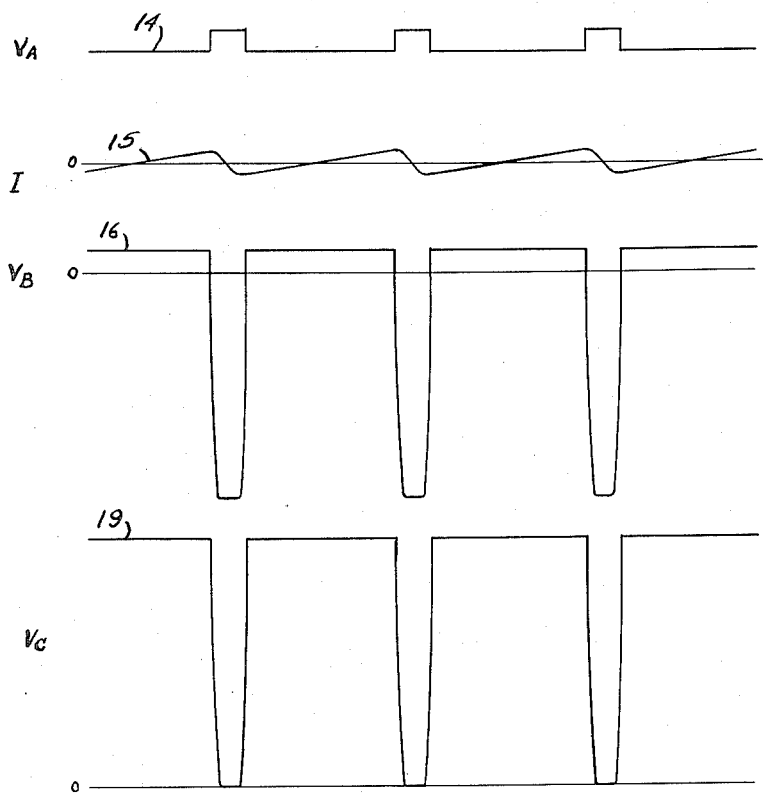
Fig. 2 is a view illustrating the wave forms at various points of the circuit of Figure 1.

Reference numerals 15 and 16 in Figure 2 respectively indicate the wave forms of the current through the inductance element 12 and the voltage at circuit point B. It may be noted that although the current I might theoretically be in one direction only, the release of energy in the first portion of the on period causes reverse current flow through transistor 11, and neglecting losses in the circuit, the current swings equally above and below the zero reference line. In practice, the losses in the circuit produce a positive shift such that about 60% of the amplitude of the wave form is above the zero axis and 40% is below.

A capacitor element 17 and a rectifier element 18 are connected in series across the inductance element 12. The rectifier element 18 is so connected as to charge the capacitor 17 during off period to a polarity as indicated in Figure 1. Charging of the capacitor 17 accounts for the flattening of the peaks of the negative pulses as illustrated in Figure 2.

According to this invention, means are provided for limiting the voltage across the rectifier element 18 during the on period, the capacitor 17 being discharged during this time interval. Preferably, the voltage-limiting means is incorporated in the rectifier element itself, by using a rectifier element in the form of a Zener diode. Such diodes are known in the art and have a characteristic such that they have a low impedance to current flow in one direction and a relatively higher impedance to current flow in the reverse direction which varies in a manner to maintain a substantially constant voltage across the element.

With this arrangement, the voltage at a circuit point C with respect to ground, that is the voltage across the rectifier 18, will have a wave form as indicated by reference numeral 19 in Figure 2. It will be noted that this voltage is substantially equal to zero during the off periods, and the voltage is limited to a substantially constant value during on periods.

Accordingly, the wave form 19 may be maintained constant irrespective of variations in load and other operating conditions.

An output circuit is coupled across one of the elements 12, 17 and 18. For example, the potentiometer 20 is connected across the element 18, with the movable contact of the potentiometer connected to an output terminal 21, preferably through a rectifier 22 with a filter capacitor 23 connected between the terminal 21 and ground. By using the potentiometer 20, the output voltage may be adjusted to any desired value between zero and the regulation voltage characteristic of the rectifier 18. By using the rectifier 22 and the capacitor 23, the output voltage is maintained substantially equal to the maximum value of the voltage between the movable contact of potentiometer 20 and ground, rather than to the average value of that voltage.

In many cases, it may be desirable to obtain a voltage output which is substantially higher than the regulated voltage characteristic of the element 18. In this case, a transformer 24 is provided having a primary 25 connected across one of the elements 12, 17 and 18, it being shown connected across the inductance element 12. The transformer has a secondary 26 connected through a rectifier 27 to output terminals 28 and 29, with a filter capacitor 30 connected between the output terminals 28 and 29.

It will be appreciated that with this arrangement, the voltage appearing across the secondary 26 will have a wave form substantially the same as the wave form 16 of Figure 2, but with an increased amplitude, depending upon the turns ratio of the transformer. Through the operation of the voltage-limiting means, the output voltage at terminals 28 and 29 is maintained substantially constant.

Reference is now made to Figure 3, which illustrates the invention as applied to a television camera tube circuit. Reference numeral 31 designates a camera tube of the photoconductive type, comprising a signal electrode or target 32 on which a thin layer of photoconductive material is deposited; an electron-emitting cathode 33; a control grid or electrode 34; an accelerating grid or electrode 35; a focusing grid or electrode 36; and a pair of deflection coils 37 and 38. The tube 31 also includes a focusing field, not shown.

In operation, an image is focused on the photoconductive layer of the target 32 and an electron beam produced by elements 33—36 is caused to scan the target 32 by connecting suitable sweep circuits to the deflection coils 37 and 38. At any instant, the electron current flow from the beam to the signal electrode or target 32 will be proportional to the light intensity of the point on which the beam is at that instant focused, and there is thus produced a video signal at the target 32. The target 32 is connected to a terminal 39 which is connected to the input of a video amplifier.

The control grid 34 is grounded as illustrated and the cathode 33 is connected through a resistor 40 to ground, and also to a terminal 41, to which blanking signals are applied.

The vertical deflection coil 37 is connected to a terminal 42, to which suitable saw tooth signals are applied, and the horizontal deflection coil 38 is connected into a power supply circuit constructed according to this invention, which is used to develop a relatively high potential at a circuit point 43 connected directly to the focusing electrode 36 and through a resistor 44 to the accelerating electrode 35, electrode 35 being connected through by-pass capacitor 45 to ground.

The deflection coil 38 is connected at one end to ground and at the other end to a capacitor 46 to a circuit point 47. The circuit point 47 corresponds to the circuit point B of the circuit of Figure 1, and the deflection coil 38 performs the same function as the inductance 12 of the circuit of Figure 1. The only difference is that the capacitor 47 removes the D.C. component, so that the deflection of the cathode ray beam, as produced by the varying field of the coil 38, will be centered. Thus the current through the coil 38 will have the same form as indicated by reference numeral 15 in Figure 2, but the average value thereof will be zero.

The circuit point 47 is connected to the collector of a transistor 48 having a base connected to a terminal 49 and having an emitter connected to the positive terminal of a battery 50, the negative terminal of which is connected to ground. The transistor 48 corresponds to the transistor 11 of Figure 1, and the battery 50 corresponds to the battery 13 of Figure 1, a signal being applied to the terminal 49 of the same form as indicated by reference numeral 14 in Figure 2.

The circuit point 47 is initially connected through a capacitor 51, a rectifier 52 and the parallel combination of a capacitor 53 and a rheostat 54, to ground, a potentiometer 55 being connected across the rectifier 52. The movable contact of the potentiometer 55 is connected through a rectifier 56 to a circuit point 57 which is connected through a capacitor 58 to ground.

The capacitor 51, the rectifier 52, the potentiometer 55, the rectifier 56 and the capacitor 58 respectively corresponds to the elements 17, 18, 20, 22 and 23 of the circuit of Figure 1, and operate in exactly the same fashion, the only difference between the two circuits being in the interposition of the rheostat 54 and capacitor 53 parallel therewith. In the operation of the circuit, a small D.C. voltage is built up across the capacitor 53, depending upon the adjustment of the rheostat 54, this voltage being effectively connected in series with the exciting voltage of the deflection coil 38. By adjustment of this voltage developed across the capacitor 53, the amplitude of the current variation in the horizontal deflection coil 38 is varied, and thereby the "width" of the scan of the target 32. The provision of the elements 53 and 54 does not otherwise affect the operation of the circuit, except insofar as it might produce slight variations in the relative levels of the voltages.

A transformer 59 is provided, having a primary 60 connected between the circuit point 47 and the junction between elements 52, 53, 54 and 55, and having a secondary 61 connected between the terminal 57 and a rectifier 62 connected to the circuit point 43 and through a capacitor 63 to ground.

This circuit operates in the same fashion as the transformer 24 and associated elements of the circuit of Figure 1. It is to be noted that the output voltage developed across the transformer secondary 61 is connected in series with the voltage developed across the capacitor 58.

With this arrangement, the required adjustment of the output voltage is effected by adjustment of the potentiometer 55.

A capacitor 64 is preferably connected across the horizontal deflection coil 38, to perform the same function as the capacitor 12a of the circuit of Figure 1.

By way of illustrative example, and not by way of limitation, the diode 52 may have a characteristic such as to limit the voltage thereacross to 60 volts and the transformer 59 may have a turns ratio of 3:1. Thus by adjustment of the potentiometer 55, a regulated output voltage of any value between 180 and 240 volts is obtained. With respect to other components, the camera tube 31 may be a RCA Vidicon type 6198, with standard deflection coils; the capacitor 46 may have a value of 50 microfarads; the battery 50 may have a 6 volt output; the capacitor 51 may have a value of 0.047 microfarad; the capacitor 53 may have a value of 100 microfarads; the rheostat 54 may have a maximum resistance of 100 ohms; the potentiometer 55 may have a value of 500,000 ohms; the capacitor 58 may have a value of 0.047 microfarad; the capacitor 63 may have a value of 0.1 microfarad; and the capacitor 64 may have a value on the order of 0.0015 microfarad.

It will be understood that modifications and variations may be effected without departing from the spirit and scope of the novel concepts of this invention.

I claim as my invention:

1. In a power supply circuit, an inductance, low impedance switch means for intermittently connecting said inductance to a direct current source, a capacitor, a rectifier connecting said capacitor to said inductance and so poled as to charge said capacitor during the time intervals when said inductance is disconnected from the direct current source, and means for limiting the voltage across said rectifier means during the time intervals when said inductance is connected to the direct current source.

2. In a power supply circuit, an inductance element, low impedance switch means for intermittently connecting said inductance element to a direct current source, a capacitor element, a rectifier element connecting said capacitor element to said inductance element and so poled as to charge said capacitor element during the time intervals when said inductance element is disconnected from the direct current source, means for limiting the voltage across said rectifier element during the time intervals when said inductance element is connected to the direct current source, and an output circuit coupled across one of said elements.

3. In a power supply circuit, an inductance element, means for intermittently connecting said inductance element to a direct current source, a capacitor element, a rectifier element connecting said capacitor element to said inductance element and so poled as to charge said capacitor element during the time intervals when said inductance element is disconnected from the direct current source, means for limiting the voltage across said rectifier element during the time intervals when said inductance element is connected to the direct current source, and an output circuit coupled across one of said elements, and including rectifier means arranged to conduct during the time intervals when said inductance element is connected to said direct current source.

4. In a power supply circuit, an inductance, low impedance switch means for intermittently connecting said inductance to a direct current source, a capacitor, a Zener diode connecting said capacitor to said inductance and so poled as to charge said capacitor during the time intervals when said inductance is disconnected from the direct current source, said diode being operative to limit the voltage thereacross during the time intervals when said inductance is connected to the direct current source.

5. In a power supply circuit, an inductance element, low impedance switch means for intermittently connecting said inductance element to a direct current source, a capacitor element, a rectifier element connecting said capacitor element to said inductance element and so poled as to charge said capacitor element during the time intervals when said inductance element is disconnected from the direct current source, means for limiting the voltage across said rectifier element during the time intervals when said inductance element is connected to the direct current source, a transformer having primary and secondary windings, and means coupling said primary winding across one of said elements.

6. In a power supply circuit, an inductance element, low impedance switch means for intermittently connecting said inductance element to a direct current source, a capacitor element, a rectifier element connecting said capacitor element to said inductance element and so poled as to charge said capacitor element during the time intervals when said inductance element is disconnected from the direct current source, means for limiting the voltage across said rectifier element during the time intervals when said inductance element is connected to the direct current source, a transformer having primary and secondary windings, means coupling said primary winding across one of said elements, and rectifier means connected in circuit with said secondary winding.

7. In a power supply circuit, an inductance element, low impedance switch means for intermittently connecting said inductance element to a direct current source, a capacitor element, a rectifier element connecting said capacitor element to said inductance element and so poled as to charge said capacitor element during the time intervals when said inductance element is disconnected from the direct current source, means for limiting the voltage across said rectifier element during the time intervals when said inductance element is connected to the direct current source, a transformer having primary and secondary windings, and means applying the voltage across one of said elements in series with the voltage across said transformer secondary to an output circuit.

8. In a television camera circuit, a camera tube including at least one deflection coil, low impedance switch means for intermittently coupling said coil to a direct current source, a capacitor, a rectifier connecting said capacitor to said coil and so poled as to charge said capacitor during the time intervals of disconnection from the direct current source, and means for limiting the voltage across said rectifier means during the time intervals of connection to said direct current source.

9. In a television camera circuit, a camera tube including a beam accelerating electrode and at least one deflection coil, low impedance switch means for intermittently connecting said coil to a direct current source, a capacitor, a rectifier connecting said capacitor to said coil and so poled as to charge capacitor during the time intervals of disconnection from the direct current source, means for limiting the voltage across said rectifier during the time intervals of connection to the direct current source, and an output circuit connected in circuit with said coil and arranged to apply operating potentials to said accelerating electrode.

10. In a power supply circuit, and inductance element, low impedance switch means for intermittently connecting said inductance element to a direct current source, a capacitor element, a rectifier element connecting said capacitor element to said inductance element and so poled as to charge said capacitor element during the time intervals when said inductance element is disconnected from the direct current source, means for limiting the voltage across said rectifier element during the time intervals when said inductance element is connected to the direct current source, and a potentiometer connected across one of said elements to produce an adjustable regulated voltage.

11. In a power supply circuit, an inductance, low impedance switch means for intermittently connecting said inductance to a direct current source, a capacitor, a rectifier connecting said capacitor to said inductance and so poled as to charge said capacitor during the time intervals when said inductance is disconnected from the direct current source, and a second capacitor connected across said inductance to form a resonant circuit having a period equal to twice the duration of the time interval when said inductance is disconnected from the direct current source.

12. In a power supply circuit, and inductance, low impedance switch means for intermittently connecting said inductance to a direct current source, a capacitor, a Zener diode connecting said capacitor to said inductance, and a second capacitor connected across said inductance to form a resonant circuit having a period equal to twice the duration of the time interval when said inductance is disconnected from the direct current source.

References Cited in the file of this patent

UNITED STATES PATENTS

| | | |
|---|---|---|
| 2,712,092 | Schwartz | June 28, 1955 |
| 2,794,149 | Jones | May 28, 1957 |
| 2,876,366 | Hussey | Mar. 3, 1959 |